US010017331B1

(12) United States Patent
Mahar

(10) Patent No.: US 10,017,331 B1
(45) Date of Patent: *Jul. 10, 2018

(54) SYSTEM AND METHOD FOR DISTRIBUTING VIALS TO DOWNSTREAM LOCATIONS IN AN AUTOMATED PHARMACY

(71) Applicant: Humana Inc., Louisville, KY (US)

(72) Inventor: Michael Mahar, Phoenix, AZ (US)

(73) Assignee: Humana Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,780

(22) Filed: Mar. 8, 2018

Related U.S. Application Data

(63) Continuation of application No. 15/455,632, filed on Mar. 10, 2017, now Pat. No. 9,914,594.

(51) Int. Cl.
| | |
|---|---|
| *B65G 47/68* | (2006.01) |
| *B65G 47/52* | (2006.01) |
| *B65G 47/51* | (2006.01) |
| *B65G 43/00* | (2006.01) |

(52) U.S. Cl.
CPC ............ *B65G 47/52* (2013.01); *B65G 43/00* (2013.01); *B65G 47/5145* (2013.01); *B65G 47/682* (2013.01); *B65G 47/684* (2013.01); *B65G 2201/0244* (2013.01)

(58) Field of Classification Search
CPC . B65G 47/684; B65G 47/5145; B65G 47/682
See application file for complete search history.

(56) References Cited

U.S. PATENT DOCUMENTS

| | | | |
|---|---|---|---|
| 2,315,880 A | 4/1943 | Stiles | |
| 2,389,696 A | 11/1945 | Stiles | |
| 2,560,995 A | 7/1951 | Stiles | |
| 3,044,604 A | 7/1962 | Steigleder | |
| 3,673,967 A * | 7/1972 | Kropf | B61B 5/02 |
| | | | 104/88.05 |
| 3,895,716 A * | 7/1975 | Ugo | B29D 30/0016 |
| | | | 209/564 |
| 4,003,466 A | 1/1977 | Muth et al. | |
| 4,401,207 A | 8/1983 | Garvey | |
| 5,161,665 A | 11/1992 | Cragun | |
| 6,516,938 B1 | 2/2003 | Paselsky et al. | |
| 6,575,287 B2 * | 6/2003 | Garvey | B65G 47/684 |
| | | | 198/418.6 |
| 6,612,425 B1 * | 9/2003 | Garvey | B65G 23/36 |
| | | | 198/347.1 |
| 6,648,124 B1 | 11/2003 | Garvey | |
| 6,959,802 B1 * | 11/2005 | Garvey | B65G 47/5145 |
| | | | 198/347.1 |

(Continued)

*Primary Examiner* — Thomas Randazzo
(74) *Attorney, Agent, or Firm* — Standley Law Group LLP

(57) ABSTRACT

An automated method and system for distributing vials to downstream locations in an automated pharmacy. More specifically, the present invention is a conveyor table having two U-shaped configurations for moving vials in a loop until the vials enter an open outbound lane. A barrier portion on the table guides vials from the conveyor table on an outbound lane for transport to a downstream location, such as a packing station. The outbound lane is operationally connected to a lane of stations, and the system is adapted to guide the vials to the first station that is open.

26 Claims, 2 Drawing Sheets

(56) References Cited

U.S. PATENT DOCUMENTS

| | | | |
|---|---|---|---|
| 6,964,329 B1* | 11/2005 | DiBianca | B65G 47/684 198/347.1 |
| 7,252,186 B2* | 8/2007 | Paquin | B65G 15/06 198/347.4 |
| 7,322,459 B2* | 1/2008 | Garvey | B65G 47/5145 198/341.09 |
| 7,556,777 B2 | 7/2009 | Victor | |
| 7,617,926 B2 | 11/2009 | Jacob et al. | |
| 9,714,144 B2 | 7/2017 | Earling et al. | |
| 9,845,201 B1 | 12/2017 | Trinh | |
| 9,914,594 B1* | 3/2018 | Mahar | B65G 47/52 |
| 2003/0106772 A1 | 6/2003 | Garvey | |
| 2015/0169846 A1* | 6/2015 | Pedrazzini | G01N 35/00871 700/230 |
| 2016/0209438 A1* | 7/2016 | Savonsalmi | B65G 47/846 |

* cited by examiner

SYSTEM AND METHOD FOR DISTRIBUTING VIALS TO DOWNSTREAM LOCATIONS IN AN AUTOMATED PHARMACY

BACKGROUND

This application is a continuation of U.S. application Ser. No. 15/455,632, filed Mar. 10, 2017, the content of which is hereby incorporated by reference as if fully recited herein.

The present invention is directed to the field of automated dispensing systems, more particularly to the transport of objects such as pharmacy bottles/vials through an automated dispensing system. The present invention relates to an automated method and system for distributing vials to downstream locations in an automated pharmacy. More specifically, the present invention is a conveyor table having two U-shaped conveyors for moving vials in a loop until they hit an open outbound lane. A barrier portion on the table guides vials from the conveyor table to an outbound lane for transport to a downstream location, such as a packing station. The outbound lane is operationally connected to a lane of stations, and the system is adapted to guide the vials to the first station that is open.

Many health benefit plan providers and retail pharmacies offer their clients the option of obtaining prescription drugs by mail. Mail order pharmacies ship prescription drugs to a client's home so the client is not required to visit a pharmacy to fill a prescription in person. For clients with chronic conditions or other health conditions that require maintenance drugs, a mail order prescription program is an attractive benefit because it is more convenient for the clients and typically less expensive than obtaining prescription drugs at a neighborhood pharmacy. Clients have the option of purchasing many widely-prescribed maintenance drugs, for example, in a 60-day or even a 90-day supply at a lower cost than a 30-day supply.

Most mail order pharmacies use automated systems and dispensing lines to process and ship a high volume of prescriptions on a daily basis. Each prescription medication is typically dispensed into a vial or other container labeled with data from an electronic order that identifies the patient, drug (e.g., by NDC), dosage, and quantity. Each medication is dispensed in its own vial and in many instances, multiple vials are combined into a single package and shipped to a single address for a client with one or more chronic conditions requiring multiple medications. The automated dispensing system, therefore, must be intelligent and capable of determining which vials should be combined into a single package. The system must also be capable of routing the vials through the system to their appropriate destinations. Sensors deployed at many locations along the system detect the prescription information on the bottles along with RFID tag information to intelligently route and divert the vials to the appropriate conveyor or destination. If the vial is to be combined with other vials (multi-vial order), the vials are sorted and grouped together, preferably towards the end of the dispensing line. The vials are ultimately routed to the final location for packaging and mailing to the consumer.

Automated dispensing lines typically comprise multiple sorting stations and therefore, require functionality to route and divert vials to the appropriate station. The process of routing and diverting vials for sorting and consolidation as well as other reasons can increase vial travel and processing time.

Depending upon how the technology is implemented and deployed within a mail order pharmacy, a substantial number of steps in the fulfillment process may be automated and the need for human intervention minimized. Transporting bottles through the automated dispensing lines in an efficient, timely, accurate, and consistent manner is crucial for filling the high volume of mail order prescriptions.

One technique for processing multi-prescription orders is to group the vials for the order and process them together so that all vials arrive for packaging and shipping as a group. Although "group processing" of vials is a logical approach to processing and packaging vials destined for a single address, it is not an efficient approach. Implementation of "group processing" on an automated dispensing line may require development of sophisticated algorithms for determining a reasonable or adequate route for the vials to travel as well as holding or reordering of other orders to permit the vials for a multi-prescription order to travel on the line as a group. The requirement for holding and reordering of orders increases vial processing time. In addition, processing of the vials in a group may require longer overall travel times for the vials as the vials are routed as a group and required to make unnecessary stops at stations other than the one station that has the appropriate medication for the vial.

A more efficient approach to processing of multi-prescription orders involves processing each vial of medication separately and then sorting and consolidating or regrouping them for packaging and shipping to a single address. Single vial processing is typically more efficient than group vial processing and reduces the overall travel and processing time for each vial. Single vial processing, however, requires the development of methods for tracking the vials during processing and eventually, sorting and consolidating them for packaging and shipping. The sorting/consolidation process typically involves diverting vials of a multi-prescription order to a sorting station where vials are held until all of the vials for an order have arrived. The vials are grouped at the station and then released for packaging.

Processing times for vials on an automated dispensing line are impacted by various routing and diverting techniques that are employed to facilitate single vial processing as well as multi-prescription order processing. There is a need for an improved pharmaceutical vial processing system and method that reduces processing delays attributable to routing and diverting techniques.

Within a typical pharmacy production facility, there are automatic processes for the counting and sorting of pill tablets. For example, orders for vials of particular pills are processed automatically through an integrated system of pill counters and conveyors for transporting the vials to the appropriate outbound conveyor location (e.g., or a sorter location). Typically, these facilities are configured with multiple outbound conveyor lanes to allow for higher vial production volumes.

However, with this type of arrangement, multiple vials assigned to one specific order might be distributed to different take away or outbound conveyors which presents problems with the desired goal of getting all of the vials to reach the same downstream order sorter location. When a vial assigned to an order does not reach the designated order sorter location at approximately the same time as the other vials in the same order, the release of that order will be delayed, slowing order sorter throughput and diminishing overall productivity of the system.

Additional complications can also arise because demand for different drugs constantly changes which can result in high vial numbers occupying an inbound lane. To cope with these high vial numbers, the control system in typical conveyor systems would have to transfer vials across conveyor lanes up to three times or more to keep both the load balanced on the inbound lane and get the vials to their correct order sorter location. These systems were set up as single-file conveyor lanes throughout a majority of the system. Such a system requires complex control systems, sensors, and a large number of diverter devices for diverting vials from one conveyor onto another. The need for such complex control systems having a large number of hardware components decreases the speed of the automated systems, increases the cost of the systems, and increases the probability that the system will malfunction or break down.

Product conveyor and accumulation systems are previously known. For example, U.S. Patent Nos. 6,575,287 and 6,648,124, describe product conveying and accumulation systems for transporting products from an upstream to downstream location. These systems are comprised of multiple conveyors positioned next to each other to move objects from one end of the conveyor to the other end. These systems can also be used with guide rails and object guides to move objects to desired locations or outbound channels. If these outbound channels are full or backed up, the objects are allowed to circulate around the conveyor system until a channel becomes free.

The present invention relates to a new type of automated pharmacy prescription fulfillment system using specifically configured mass flow conveyor tables at predetermined points in the system to route vials to desired destinations within the automated pharmacy system. These mass flow conveyor tables allow vials to move along the conveyors systems in a mass flow rather than a single-file line. These mass flow tables eliminate the need for complex control systems, reduce the need for many diversion mechanisms for diverting vials off single-file conveyor lanes, and reduces the need for many sensors for sensing and balancing vial loads on single-lane conveyors. For example, use of mass flow conveyor tables at certain predetermined points of the automated pharmacy system can be used to accumulate vials and/or to distribute them to outbound conveyor lanes automatically as these outbound lanes become available (or open up). These mass flow conveyor tables can also be configured to provide overflow lanes in case the primary lanes back up.

The present system uses specifically configured mass flow vial conveyor systems at predetermined locations of the automated pharmacy line to fill prescriptions orders in a more effective, faster, and efficient way than traditional conveyor systems using single-file conveyor lines.

SUMMARY OF THE GENERAL INVENTIVE CONCEPT

In one embodiment of the invention, the invention is comprised of: a first conveyor portion configured in a U-shape configuration, wherein the first conveyor portion is comprised of a curved portion, a first side portion, and a second side portion; a second conveyor portion configured in a U-shape configuration, wherein the second conveyor portion is comprised of a curved portion, a first side portion and a second side portion; wherein the curved portion of the first conveyor portion is at the opposite end of the table from the curved portion of the second conveyor portion; wherein the first side portion of the first conveyor portion runs parallel to, and in the same direction as, the first side portion of the second conveyor portion; wherein the second side portion of the first conveyor portion runs parallel to, and in the same direction as, the second side portion of the second conveyor portion; a first inbound conveyor lane positioned to transport vials onto the conveyor table; a first outbound conveyor lane positioned to transport vials from the conveyor table to a first downstream destination; a first barrier portion positioned on the conveyor table for guiding vials from the conveyor table onto the first outbound lane; and wherein the conveyor table is configured to transport vials around the table and wherein vials entering the table from the first inbound conveyor lane hit the first barrier portion and wherein the first barrier portion is adapted to guide vials onto the first outbound conveyor lane if it is open and wherein the vials move onto the first side portion of the second conveyor portion if the first outbound conveyor lane is full or closed, and wherein the conveyor table is adapted to move vials from the first side portion of the second conveyor portion to the second side portion of the second conveyor portion.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The following detailed description of the exemplary embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

The present invention relates to a mass flow vial conveyor system for accumulating and/or distributing vials for prescription fulfillment. Mass flow conveyor systems or tables at various locations in the pharmacy line move bottles/vials in mass quantities as opposed to a single-file, dedicated, conveyor line process used at traditional automated pharmacy fulfillment systems. Use of these mass flow conveyor systems increases speed and increases reliability of the pharmacy line by reducing the number of controls needed for a single-file type pharmacy line. For example, in the present system, a mass flow vial conveyor system may be used for distributing the single-vial prescription orders to packing stations (the mass flow table moves the vials around and distributes the vials to available packing stations for packing and then mailing to customers). In the preferred embodiment, each outbound lane of the mass flow table feeds a packing station with overflow lanes available if all of the packing stations are at full capacity.

After vials have been filled and capped, vials are transported by conveyors to a packing station where the vials are packaged for mailing to consumers. In one embodiment, there are two separate packing areas, one for single-vial orders and another for multi-vial orders as previously discussed. In the present invention, a mass flow vial conveyor system distributes the single-vial prescription orders to packing stations. Its function is to feed single vial orders to the packing stations in a cascading/waterfall fashion.

Figure 1:
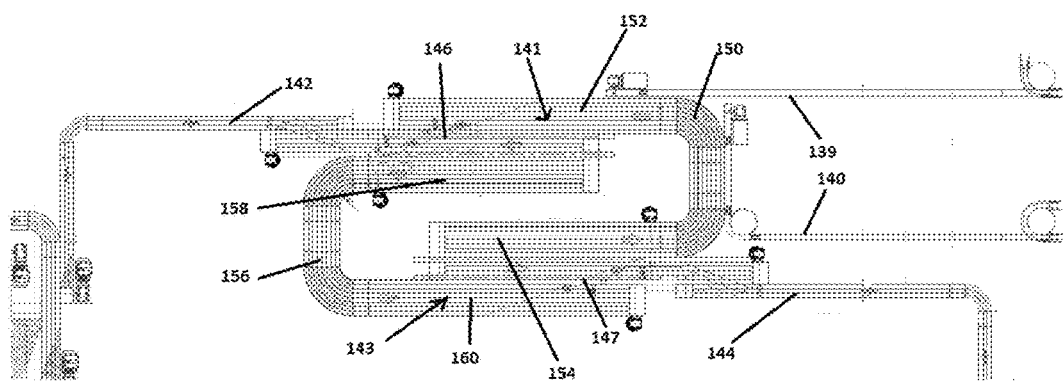
FIG. 1 illustrates a top plan view of one embodiment of the conveyor distribution table for distributing vials to the single-vial packing stations.

FIG. 1 illustrates one embodiment of the conveyor distribution table for distributing vials to the single-vial packing stations (top diagram view). In this embodiment, vials enter the table from two inbound lanes 139, 140 from an upstream location. The vials move around the conveyor table to a first conveyor portion 141 of the table and enter the first outbound conveyor lane 142 if it is open (not full of vials or blocked). If the first outbound lane is not open, the vials will circulate to a second conveyor portion 143 of the table and enter a second outbound conveyor lane 144 if it is open. As previously discussed, the distribution table is adapted with barriers or guides 146, 147 that guide the vials from the table to the outbound conveyor lanes. There are openings in the barrier/guide that lead to the outbound conveyor lanes. When these openings are not open, the vials cannot enter the opening and therefore the vials keep circulating around the table until an outbound lane opens up.

The barriers or guides are preferably pieces of hard white plastic—e.g., ultra-high molecular weight (UHMW) polyethylene barriers or guide portions—placed on the table. These plastic pieces are shaped in such a way as to direct or guide puck flow into the first outbound lane that is not full. In essence, the methodology relies on physics. If enough pucks have gathered in the first outbound lane, for instance, then the shape of the UHMW guide portion will flow the pucks down the moving conveyor to the next outbound lane, e.g., analogous to the movement of a cascading waterfall. When one lane fills up, the pucks coming down the table move down to the next open lane.

Pairing these plastic "arms" or barriers or guides with conveyor movement directs puck flow, eliminating the need for many PLC- and software-operated controls (e.g., photoelectric sensors, diverts, puck stops, RFIDs). The UHMW plastic material is extremely durable, known for its ability to resist abrasion and impact. Because of these properties, UHMW's benefits include cutting down on maintenance costs and energy consumption.

More specifically, in the embodiment of FIG. 1, the conveyor table is comprised of a:

a. a first conveyor portion 141 that is configured in a U-shape configuration, wherein the conveyor travels in the direction as indicated by the arrows in FIG. 1, and wherein the first conveyor portion is comprised of a curved portion 150, a first side portion 152 and a second side portion 154;
b. the second conveyor portion 143 also configured in a U-shape configuration, wherein the conveyor travels in the direction as indicated by the arrows in FIG. 1, and wherein the second conveyor portion is comprised of a curved portion 156, a first side portion 158 and a second side portion 160;
c. wherein the curved portion of the first conveyor portion is at the opposite end of the table from the curved portion of the second conveyor portion;
d. wherein the first side portion of the first conveyor portion runs parallel to, and in the same direction as, the first side portion of the second conveyor portion;
e. wherein the second side portion of the first conveyor portion runs parallel to, and in the same direction as, the second side portion of the second conveyor portion;
f. a first inbound conveyor lane 139 positioned to transport vials onto the conveyor table (e.g., onto the first side portion of the first conveyor portion);
g. a first outbound conveyor lane 142 positioned to transport vials from the conveyor table to a first downstream destination;
h. a first barrier portion 146 positioned on the conveyor table for guiding vials from the conveyor table onto the first outbound lane;
i. a second outbound conveyor lane 144 positioned to transport vials from the conveyor table to a second downstream destination;
j. a second barrier portion 147 positioned on the conveyor table for guiding vials from the table onto the second outbound lane;
k. a second inbound conveyor lane 140 positioned to transport vials onto the conveyor table (e.g., the curved portion of the first conveyor portion);
l. wherein the conveyor table is configured to transport vials around the table and wherein vials entering the table from the first inbound conveyor lane hit the first barrier portion and wherein the first barrier portion is adapted to guide vials onto the first outbound conveyor lane if it is open and wherein the vials move onto the first side portion of the second conveyor portion if the first outbound conveyor lane is full or closed, and wherein the conveyor table is adapted to move vials from the first side portion of the second conveyor portion to the second side portion of the second conveyor portion;
m. wherein the conveyor is adapted to transport vials on the second side portion of the second conveyor portion to the second barrier portion and wherein the second barrier portion is adapted to guide vials into the second outbound conveyor lane if it is open and wherein the vials move onto the second side portion of the first conveyor portion if the second outbound conveyor lane is full or closed;
n. a first intervening conveyor portion positioned between the first side portions of the first and second conveyor portions;
o. a second intervening conveyor portion positioned between the second side portions of the first and second conveyor portions.

Figure 2:
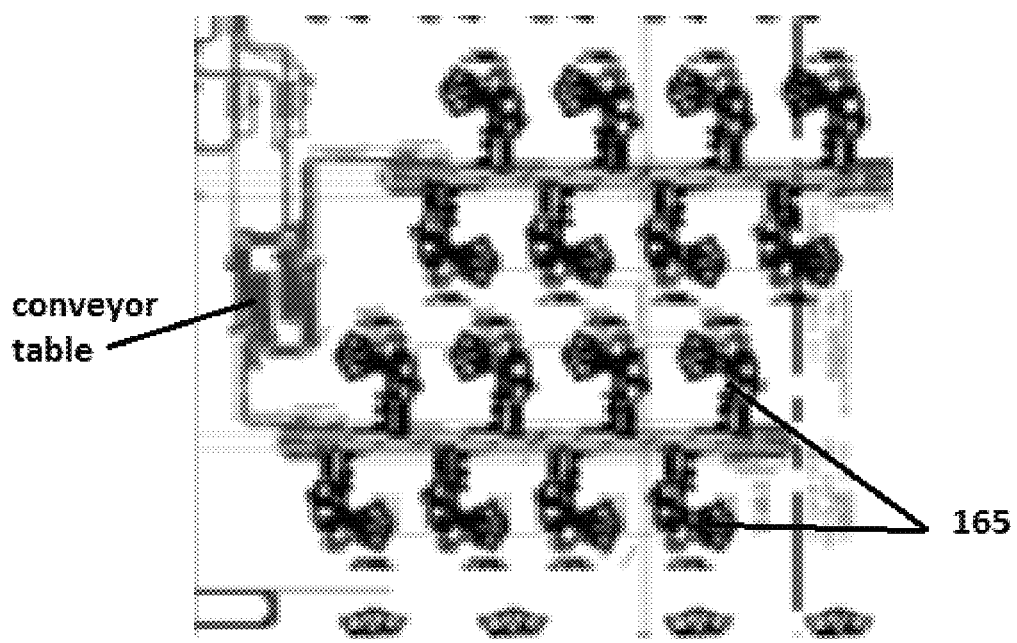
FIG. 2 illustrates rows of packing stations connected to outbound lanes of the conveyor distribution table.

The first and second outbound conveyor lanes 142, 144 each lead to a plurality of packing stations, respectively. For example, FIG. 2 illustrates an embodiment where each outbound lane leads to rows of packing stations 165. The vials will automatically go into a packing station that is open (via guides that guide the vial into a conveyor lane leading to the packing station). If the packing station lane is full (backed-up), the vial will move on to the next station, and so on and so forth, and enter the next station that is open (e.g., a waterfall effect on the table). In other words, the packing stations are configured in a stacked configuration so that vials will go into the first packing station that is open and wherein the vials will move past full packing stations. Gates may be placed at the entrance to a packing station if it is desired to close down a particular packing station for maintenance, work flow, load or other reasons.

In another embodiment of the conveyor table of FIG. 1, there is only one inbound conveyor lane and one outbound conveyor lane. In such a system, the conveyor table is adapted to move the vials around the first and second conveyor portions in a loop pattern until the first barrier guides the vials onto the first outbound lane.

While certain embodiments of the present invention are described in detail above, the scope of the invention is not to be considered limited by such disclosure, and modifications are possible without departing from the spirit of the invention as evidenced by the following claims.

What is claimed is:

1. A vial conveying and distributing system for distributing vials, comprising:
   a conveyor table comprised of:
      a first conveyor portion, wherein the first conveyor portion is comprised of a curved portion, a first side portion, and a second side portion;
      a second conveyor portion, wherein the second conveyor portion is comprised of a curved portion, a first side portion and a second side portion;
      wherein the curved portion of the first conveyor portion is at the opposite end of the table from the curved portion of the second conveyor portion;
      wherein the first side portion of the first conveyor portion runs parallel to, and in the same direction as, the first side portion of the second conveyor portion;
      wherein the second side portion of the first conveyor portion runs parallel to, and in the same direction as, the second side portion of the second conveyor portion;
   a first inbound conveyor lane positioned to transport vials onto the conveyor table;
   a first outbound conveyor lane positioned to transport vials from the conveyor table to a first downstream destination;
   a second outbound conveyor lane positioned to transport vials from the conveyor table to a second downstream destination; and
   wherein the conveyor table is configured to transport vials around the table and wherein the vials move onto the first side portion of the second conveyor portion if the first outbound conveyor lane is not open, and wherein the conveyor table is adapted to move vials from the first side portion of the second conveyor portion to the second side portion of the second conveyor portion.

2. The system of claim 1, wherein the first inbound lane is positioned to transport vials onto the first side portion of the first conveyor portion.

3. The system of claim 1, wherein the first and second conveyor portions are each configured in a U-shaped configuration; and wherein the system is further comprised of:
   a first barrier portion positioned on the conveyor table for guiding vials from the conveyor table onto the first outbound lane; and
   wherein vials entering the table from the first inbound conveyor lane hit the first barrier portion and wherein the first barrier portion is adapted to guide vials onto the first outbound conveyor lane if it is open.

4. The system of claim 3, further comprising:
   a second barrier portion positioned on the conveyor table for guiding vials from the table onto the second outbound lane.

5. The system of claim 4, wherein the second conveyor portion is adapted to transport vials on the second side portion of the second conveyor portion to the second barrier portion and wherein the second barrier portion is adapted to guide vials into the second outbound conveyor lane if it is open and wherein the vials move onto the second side portion of the first conveyor portion if the second outbound conveyor lane is not open.

6. The system of claim 5, further comprising a second inbound conveyor lane positioned to transport vials onto the conveyor table.

7. The system of claim 1, further comprising a second inbound conveyor lane positioned to transport vials onto the conveyor table.

8. The system of claim 1, further comprising:
   a first intervening conveyor portion positioned between the first side portions of the first and second conveyor portions.

9. The system of claim 8, further comprising:
   a second intervening conveyor portion positioned between the second side portions of the first and second conveyor portions.

10. The system of claim 1, further comprising:
    a first lane of packing stations operationally connected to the first outbound conveyor lane, wherein the system is adapted so that vials will go into the first packing station that is open.

11. The system of claim 10, wherein the first lane of packing stations is configured in a stacked configuration so that vials will go into the first packing station that is open and wherein the vials will move past packing stations that are not open.

12. The system of claim 11, further comprising:
    a plurality of gates placed at the entrances of each of the packing stations for blocking entry into the packing stations when the gates are closed.

13. The system of claim 5, further comprising:
    a second lane of packing stations operationally connected to the second outbound conveyor lane, wherein the system is adapted so that vials will go into the first packing station that is open.

14. The system of claim 1, wherein the conveyor table is adapted to move vials around the first and second conveyor portions in a loop pattern until the first barrier portion guides the vials onto the first outbound lane.

15. A vial conveying and distributing system for distributing vials, comprising:
    a conveyor table comprised of:
       a first conveyor portion, wherein the first conveyor portion is comprised of a curved portion, a first side portion, and a second side portion;
       a second conveyor portion, wherein the second conveyor portion is comprised of a curved portion, a first side portion and a second side portion;
       wherein the curved portion of the first conveyor portion is at the opposite end of the table from the curved portion of the second conveyor portion;
       wherein the first side portion of the first conveyor portion runs parallel to, and in the same direction as, the first side portion of the second conveyor portion;
       wherein the second side portion of the first conveyor portion runs parallel to, and in the same direction as, the second side portion of the second conveyor portion;
    a first inbound conveyor lane positioned to transport vials onto the conveyor table;
    a first outbound conveyor lane positioned to transport vials from the conveyor table to a first downstream destination;
    a first barrier portion positioned on the conveyor table for guiding vials from the conveyor table onto the first outbound lane;
    a second outbound conveyor lane positioned to transport vials from the conveyor table to a second downstream destination; and
    wherein the conveyor table is configured to transport vials around the table and wherein vials entering the table from the first inbound conveyor lane hit the first barrier portion and wherein the first barrier portion is adapted to guide vials onto the first outbound conveyor lane if it is open and wherein the vials move onto the first side portion of the second conveyor portion if the first outbound conveyor lane is not open, and wherein the conveyor table is adapted to move vials from the first side portion of the second conveyor portion to the second side portion of the second conveyor portion; and a first lane of packing stations operationally connected to the first outbound conveyor lane, wherein the system is adapted so that vials will go into the first packing station that is open.

16. The system of claim 15, wherein the first lane of packing stations is configured in a stacked configuration so that vials will go into the first packing station that is open and wherein the vials will move past packing stations that are not open.

17. The system of claim 15, further comprising:
a plurality of gates placed at the entrances of each of the packing stations for blocking entry into the packing stations when the gates are closed.

18. A vial conveying and distributing system for distributing vials, comprising:
a conveyor table comprised of:
a first conveyor portion having a first curved portion;
a second conveyor portion operationally connected to the first conveyor portion,
the second conveyor portion have a second curved portion;
a first inbound conveyor lane positioned to transport vials onto the conveyor table;
a first outbound conveyor lane positioned to transport vials from the conveyor table to a first downstream destination;
a second outbound conveyor lane positioned to transport vials from the conveyor table to a second downstream destination;
wherein the conveyor table is configured to transport vials around the table from the first conveyor portion to the second conveyor portion and wherein the vials move onto the second conveyor portion if the first outbound conveyor lane is not open.

19. The system of claim 18, further comprising:
a first barrier portion positioned on the conveyor table for guiding vials from the conveyor table onto the first outbound conveyor lane; and
wherein vials entering the table from the first inbound conveyor lane hit the first barrier portion and wherein the first barrier portion is adapted to guide vials onto the first outbound conveyor lane if it is open.

20. The system of claim 19, further comprising:
a second barrier portion positioned on the conveyor table for guiding vials from the table onto the second outbound lane.

21. The system of claim 20, wherein the system is adapted to transport vials on the second conveyor portion to the second barrier portion and wherein the second barrier portion is adapted to guide vials into the second outbound conveyor lane if it is open and wherein the vials move onto the first conveyor portion if the second outbound conveyor lane is not open.

22. The system of claim 21, further comprising a second inbound conveyor lane positioned to transport vials onto the conveyor table.

23. The system of claim 18, further comprising:
a first lane of packing stations operationally connected to the first outbound conveyor lane, wherein the system is adapted so that vials will go into the first packing station that is open.

24. The system of claim 23, wherein the first lane of packing stations is configured in a stacked configuration so that vials will go into the first packing station that is open and wherein the vials will move past packing stations that are not open.

25. The system of claim 18, wherein the conveyor table is adapted to move vials around the first and second conveyor portions in a loop pattern until the first outbound conveyor lane becomes open.

26. The system of claim 18, wherein the first and second conveyor portions are each U-shaped.

* * * * *